Nov. 20, 1928. 1,692,086
J. P. H. JAKOBSEN
SELF SHARPENING PLOWSHARE
Filed Nov. 19, 1926
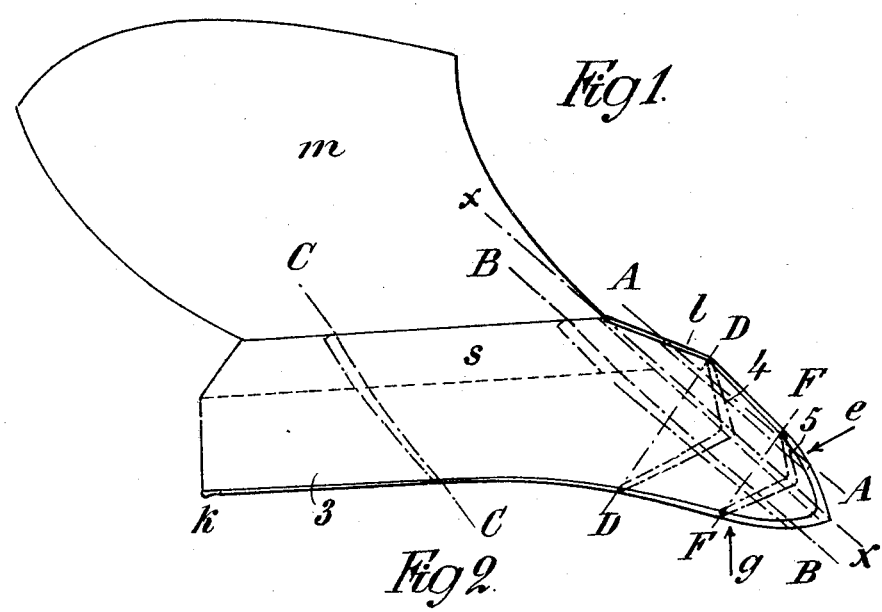
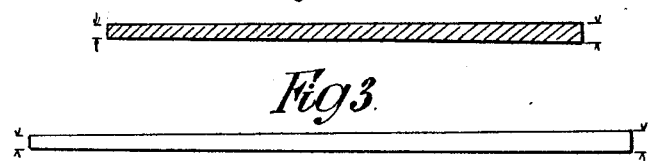
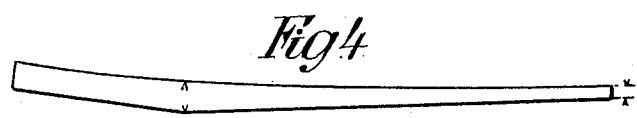
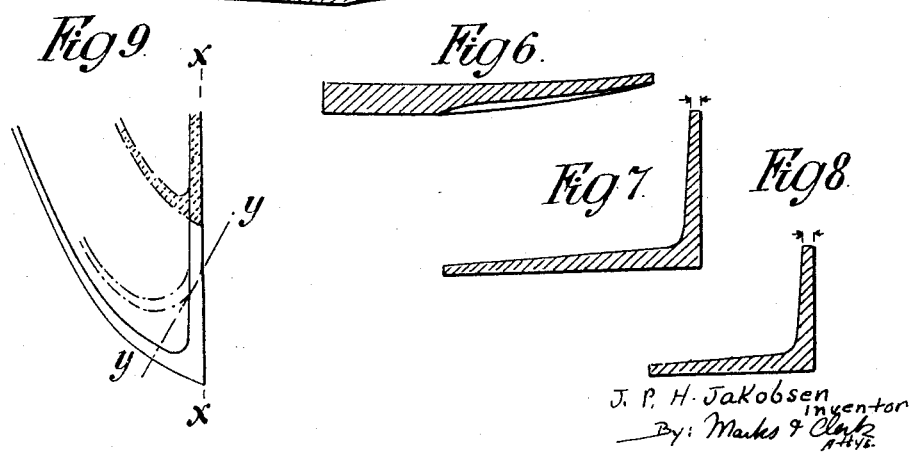

Patented Nov. 20, 1928.

1,692,086

UNITED STATES PATENT OFFICE.

JENS PETER HENRIK JAKOBSEN, OF ODENSE, DENMARK.

SELF-SHARPENING PLOWSHARE.

Application filed November 19, 1926, Serial No. 149,476, and in Denmark October 30, 1926.

This invention relates to a self-preserving plowshare made from a "one-layer" material, that is, a share which when used will wear automatically along the cutting edges so that the shape and efficiency of the share will be maintained and preserved in every way, from the time when the share is new until it is completely worn out. Accordingly a self-preserving share need never be reforged, sharpened or ground. The share according to my invention, provided with landside, is made self-preserving by the fact that the share and the landside are dimensioned in relation to each other so as to cause the share to possess the necessary stability and rigidity, while at the same time the share is thin all over in the width in which it wears, a cutting edge of suitable thickness and sharpness thus being always present. These advantages are more especially obtained by providing the point of the share (the plowpoint) with a landside which is suitably shaped and dimensioned with regard to thickness in accordance with the dimensions of the share. The landside is adapted for three purposes, namely (1) to protect and relieve the strain on the moldboard (in order that the usually appearing considerable wear on the lower and foremost portion of the moldboard may be avoided), (2) to guard the share, and more especially the point of the share, against being broken, and (3) to keep and preserve the "furrow line" of the share unaltered in spite of wear so that this line or curve will be identically the same in a share that is completely worn out as in a new share possessing its original shape.

By the "furrow line" of the share is meant a line tangent to the share, or, more correctly, to the landside of the share in the point in which the landside joins the share.

My present invention aims at dimensioning the share, as well as the landside, of a self-preserving "one-layer" plowshare in such a way that the share will preserve and maintain its shape, strength, sharpness and furrow line unaltered, until the share is completely worn out, and according to my invention the desired effect is obtained chiefly by dimensioning the share and the landside edge so that a horizontal section through the landside edge will show a decrease in width, reckoned from the front portion of the landside edge to its hind portion, while a longitudinal section through the share will show an increase in thickness, reckoned from the point of the share upwards to the moldboard.

In the drawing is illustrated the necessary details for making my invention understood.

Fig. 1 shows a perspectivic view of a moldboard together with the above mentioned self-preserving share, provided with a landside.

Figs. 2 to 8 show various sectional views of the share.

Fig. 9 is a diagrammatic illustration of the "furrow line" of the share.

Referring now to Fig. 1 the reference character $m$ indicates the moldboard, $s$ the share, the landside edge of which is indicated by the letter $l$. The landside as well as the share is made from a "one-layer" material, and according to the invention the landside is so dimensioned as to be bounded by two vertical side planes, and further so that the said boundary planes stand at an angle to each other, because the two planes must contain in them the two straight lines which form the boundary lines of the base of the landside (Fig. 3). In practice the landside is so dimensioned that its base is considerably wider in front than in the rear the word "base" indicating the shape of the underside of the landside supposing that the landside be carried right down through the share and viewed in the direction of the arrow $g$ in Fig. 1, and that a section of the landside at right angles to its base line shows decreasing thickness in the upward direction. Thus it is obtained, by employing these dimensions, that the landside or landside edge while being thicker in front, will offer no resistance worth mentioning when carried through the soil.

At the same time as the landside, according to the invention, is dimensioned as above described the share is shaped and dimensioned so that its thickness increases, reckoned from the point of the share upwards to the moldboard, as indicated in Figs. 4 and 5.

Fig. 4 illustrates the end surface of the share, that is, the shape of the outer surface of the share in case the share is thought prolonged right through the landside and viewed in the direction of the arrow $e$ in Fig. 1.

Fig. 5 shows a sectional view of the share on the line B—B in Fig. 1, that is, a vertical section parallel to the line X—X in Fig. 1 and in a little distance from this line. The section is considerably wider in the hind portion than in the front portion.

From the above it will be apparent that the share and the landside, according to the invention, are so dimensioned that the landside is thicker in front and of weaker construction in back, while at the same time the share is of weaker construction in front and thicker in back.

Figs. 7 and 8 are sectional views at right angles to the line X—X in Fig. 1. The section shown in Fig. 7 is a section on line D—D in Fig. 1 and thus passes through the top point of the landside. The section shown in Fig. 8 is a section on line F—F in Fig. 1 and it will be seen that the upper point of the section in Fig. 8 is wider than that of the section in Fig. 7 for the reason that the thickness of the landside edge increases partly in a direction forwards and partly in a direction downwards, the upper point of the section in Fig. 8 being situated in front of and lower than the upper point of the section in Fig. 7.

Fig. 6 is a sectional view on line C—C in Fig. 1 and illustrates the dimensions of the share at this point, the figure at the same time illustrating the shape of a strengthening rib $k$ along the edge of the share, as seen in the direction indicated by the arrow $e$ in Fig. 1. The strengthening rib $k$ is disposed on the bottom side of the share and normally increases in thickness towards the back edge of the share.

It has been mentioned above that the landside edge should have its greatest thickness in front, because this causes an easy passage through the soil. This easy passage again produces the effect that the landside share may be constructed of greater height.

Fig. 9 illustrates the position of the "furrow line" on the share dealt with here. The furrow line coincides with the edge line X—X, inasmuch as by the furrow line of the share is meant the line tangent to the share, or, more correctly, to the outer surface edge of the landside portion of the share, in the point in which the landside has its junction with the share. It is obtained in the present share, which wears evenly and at the same time preserves and maintains its original shape, that the furrow line X—X is constantly the same or of the same direction, for the original share shown in full lines in Fig. 9, as well as for the completely worn share indicated by the hatched portion of Fig. 9. It should be noted that the hitherto known shares will wear in the manner illustrated by the intermediate dot and dash lines in Fig. 9: the wrong or false furrow line arising herefrom, Y—Y, has been drawn in this figure.

From the above it will be understood that the main principle of my invention is to be found in the fact that the landside or landside edge decreases in thickness, while the thickness of the share increases, both as reckoned from the front edge of the share to the back edge of the same.

I claim:

1. A self-sharpening plow share having a landside edge formed of one-layer material, the plow share in the direction of plowing, increasing in thickness in the rear direction, the horizontal section of the landside edge decreasing in thickness in the direction of plowing.

2. A plow share as claimed in claim 1, characterized in that a section of the landside edge, at right angles to its base line, shows decreasing thickness in the upward direction.

In testimony whereof I affix my signature.

JENS PETER HENRIK JAKOBSEN.